(12) United States Patent
Lu

(10) Patent No.: US 8,880,346 B2
(45) Date of Patent: Nov. 4, 2014

(54) NAVIGATION DEVICE AND CONTROL METHOD THEREOF

(71) Applicants: Mitac International Corp., Taoyuan County (TW); Mitac Research (Shanghai) Ltd., Shanghai (CN)

(72) Inventor: Wen-Min Lu, Shanghai (CN)

(73) Assignees: Mitac International Corp., Kuei San Township, Taoyuan County (TW); Mitac Research (Shanghai) Ltd., Shanghai (CN)

(*) Notice: Subject to any disclaimer, the term of this patent is extended or adjusted under 35 U.S.C. 154(b) by 32 days.

(21) Appl. No.: 13/755,698

(22) Filed: Jan. 31, 2013

(65) Prior Publication Data

US 2014/0058670 A1    Feb. 27, 2014

(30) Foreign Application Priority Data

Aug. 23, 2012  (CN) .......................... 2012 1 0302603

(51) Int. Cl.
*G01C 21/00* (2006.01)
*G08G 1/123* (2006.01)
*G01C 21/34* (2006.01)
*G01C 21/36* (2006.01)

(52) U.S. Cl.
CPC ............ *G01C 21/00* (2013.01); *G01C 21/3664* (2013.01)
USPC ........... 701/533; 701/400; 701/532; 701/540; 701/541; 345/156; 345/1.1; 345/1.2; 345/1.3; 345/30

(58) Field of Classification Search
USPC ......... 701/400, 408, 409, 432, 532, 533, 540, 701/541; 345/156, 530, 531, 204, 205, 1.1, 345/1.2, 1.3, 30
See application file for complete search history.

(56) References Cited

U.S. PATENT DOCUMENTS

| 2010/0053081 | A1* | 3/2010 | Jee et al. ...................... 345/157 |
| 2010/0197356 | A1* | 8/2010 | Song et al. .................... 455/566 |
| 2011/0109567 | A1* | 5/2011 | Kim .............................. 345/173 |
| 2012/0066581 | A1* | 3/2012 | Spalink ......................... 715/232 |
| 2012/0081280 | A1* | 4/2012 | Schrock et al. ............... 345/156 |
| 2014/0049888 | A1* | 2/2014 | Ahn et al. ................. 361/679.01 |

* cited by examiner

*Primary Examiner* — Rami Khatib
(74) *Attorney, Agent, or Firm* — Muncy, Geissler, Olds & Lowe, P.C.

(57) ABSTRACT

This invention discloses a navigation device and a control method. The navigation device includes input modules, display modules and a processing module. The input modules receive drag signals inputted by a user. The display modules include a primary display screen and at least one secondary display screen, and the primary display screen displays map information or a point of interest, and the at least one secondary display screen is pivotally coupled to an adjacent side of the primary display screen and superimposed onto the primary display screen. The processing module receives the drag signal and analyzes the map information, the point of interest or both according to the drag signal to obtain a regional map, point-of-interest information or a local path planning, and controls the at least one secondary display screen to display the regional map, the point-of-interest information or the local path planning according to the drag signal.

16 Claims, 5 Drawing Sheets

NAVIGATION DEVICE AND CONTROL METHOD THEREOF

CROSS-REFERENCE TO RELATED APPLICATION

This application claims the benefit of China Patent Application No. 201210302603.8, filed on Aug. 23, 2012, in the State Intellectual Property Office of the People's Republic of China, the disclosure of which is incorporated herein in its entirety by reference.

BACKGROUND OF THE INVENTION

1. Field of the Invention

The present invention relates to a navigation device, and more particularly to the navigation device and a control method that break through the issue of a narrow field of vision in a conventional navigation device, and improving the field of vision to provide various types of information.

2. Description of Related Art

In general, a navigation device has a screen with a size falling within a range from 3 inches to 5 inches, and thus the displayed information or map will be limited by the size of the screen when it is necessary to obtain more information or nearby road information. Although a smaller screen is more convenient for carrying the device, yet the smaller screen also creates many drawbacks on its use such as the difficulty of seeing the small fonts clearly or an incomplete display of a map. As a result, the interaction between the device and users is reduced.

Therefore, navigation devices having a 7-inch screen are available in the market. However, such navigation device installed under the windshield of a car may block a driver's vision due to the large size of the screen, not only causing pressure to the driver, but also jeopardizing the safety or life of the driver.

Therefore, it is an urgent issue for related designers to design a navigation device and a control method of the navigation device, such that the size of the screen of the navigation device can be adjusted to obtain more information and map screens when a user is driving.

SUMMARY OF THE INVENTION

In view of the aforementioned problem of the prior art, it is a primary objective of the present invention to provide a navigation device and a control method thereof, wherein the navigation device can improve the field of vision while providing more information and pictures and the function of preventing light reflections.

To achieve the foregoing objective, the present invention provides a navigation device comprising a plurality of input modules, a plurality of display modules and a processing module. The plurality of input modules receives a drag signal inputted by a user. The plurality of display modules comprises a primary display screen and at least one secondary display screen, and the primary display screen displays map information or points of interest, and the at least one secondary display screen is pivotally coupled to an adjacent side of the primary display screen and superimposed onto the primary display screen. The processing module receives the drag signal, and analyze the map information, the point of interest or both according to the drag signal to obtain a regional map, point-of-interest information or local path planning, and control the at least one secondary display screen to display the regional map, the point-of-interest information or the local path planning according to the drag signal.

Wherein, the navigation device further comprises a navigation mode, such that when the navigation device enables the navigation mode, the processing module determines whether the drag signal is to drag the point of interest from the primary display screen to the at least one secondary display screen, and then the processing module analyzes a path planning information according to the map information and the point of interest, and the at least one secondary display screen displays the regional map corresponding to the point of interest, if the drag signal is to drag the point of interest from the primary display screen to the at least one secondary display screen.

Wherein, the processing module displays the local path planning corresponding to the path planning information on the at least one secondary display screen according to the point of interest or the path planning information.

Wherein, the navigation device further comprises a non-navigation mode, such that when the navigation device enables the non-navigation mode, the processing module determines whether the drag signal is to drag the map information or the point of interest from the primary display screen to the at least one secondary display screen, and the processing module controls the at least one secondary display screen to display the regional map or the point-of-interest information corresponding to the point of interest, if the drag signal is to drag the map information or the point of interest from the primary display screen to the at least one secondary display screen.

Wherein, the navigation device further comprises a non-navigation mode, such that when the navigation device enables the non-navigation mode, the processing module controls the at least one secondary display screen to expand the map information to improve the field of view of the map information.

Wherein, if the processing module determines that the drag signal is to drag the point of interest from the primary display screen to the at least one secondary display screen, then the processing module will link to the point of interest to obtain the point-of-interest information corresponding to the point of interest if the drag signal is to drag the point of interest from the primary display screen to the at least one secondary display screen.

Wherein, the at least one secondary display screen has an included angle from 0 degree to 360 degrees with the primary display screen.

Wherein, the at least one secondary display screen will block an external light source to prevent a light reflection, if the at least one secondary display screen has an included angle from 180 degrees to 360 degrees with the primary display screen.

To achieve the foregoing objective, the present invention further provides a control method applied in a navigation device, and the navigation device comprises a plurality of input modules, a plurality of display modules and a processing module, and the control method of the navigation device comprises the steps of: using the primary display screen to display map information or a point of interest; using the plurality of input modules to receive a drag signal inputted by a user; using the processing module to receive the drag signal; using the processing module to analyze the map information, the point of interest or both according to the drag signal to obtain a regional map, point-of-interest information or a local path planning; and using the processing module to control the at least one secondary display screen to display the regional map, the point-of-interest information or the local path planning according to the drag signal.

In summation, the navigation device and the control method in accordance with the present invention have one or more of the following advantages:

(1) The navigation device and the control method in accordance with the present invention can overcome the problems of the narrow field of vision of the conventional navigation device and improve the field of vision of the screen.

(2) The navigation device and the control method in accordance with the present invention allow drivers to adjust the screen freely and provide the drivers more information and pictures such as an enlarged intersection pictures, information maps or intersection maps.

(3) The navigation device and the control method in accordance with the present invention can block bright lights and prevent reflections to improve the visual effect.

The foregoing and other objectives, technical characteristics and advantages of the present invention will become apparent with the detailed description of preferred embodiments accompanied with related drawings as follows.

DETAILED DESCRIPTION OF THE PREFERRED EMBODIMENTS

The technical characteristics of the present invention will become apparent with the detailed description of preferred embodiments accompanied with related drawings as follows. It is noteworthy to point out that same numerals are used for representing the same respective elements in the following embodiments.

Figure 1:
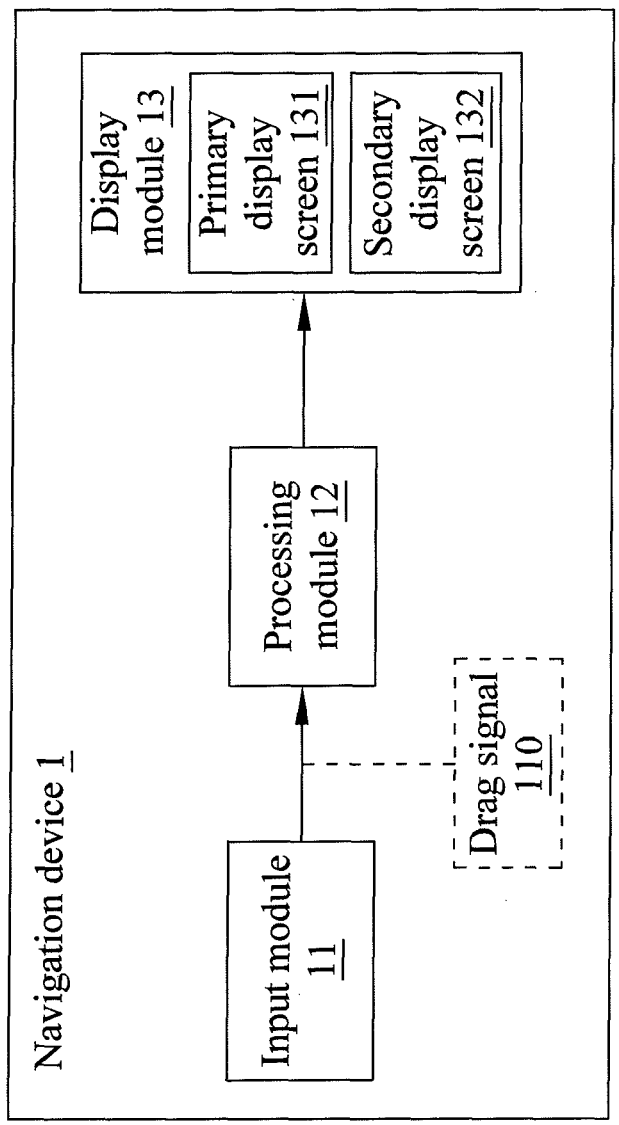
FIG. 1 is a block diagram of a navigation device in accordance with the present invention.

With reference to FIG. 1 for a block diagram of a navigation device of the present invention, the navigation device 1 comprises an input module 11, a processing module 12 and a display module 13.

Wherein, the input module 11 and the display module 13 can be touch panels, touch pads or any sensing type LCD device capable of receiving signals inputted by a touch object (such as a finger or a pen tip). The processing module 12 can be a central processing unit (CPU) or a micro-processing unit. In FIG. 1, the input module 11 can receive a drag signal 110 inputted by a user, and the drag signal 110 can be a single-touch signal or a multi-touch signal. The input module 11 is provided for a user to input the drag signal 110 through one or more fingers or a pen tip. The display module 13 comprises a primary display screen 131 and a secondary display screen 132, wherein, the secondary display screen 132 can be comprised of one or more screens. The primary display screen 131 can display map information or a point of interest, and the at least one secondary display screen 132 is pivotally coupled to an adjacent side of the primary display screen 131 and superimposed onto the primary display screen 131. The processing module 12 can receive the drag signal 110 and analyze the map information, the point of interest or both according to the drag signal 110 to obtain a regional map, point-of-interest information or a local path planning, and control the at least one secondary display screen 132 to display a regional map, point-of-interest information or a local path planning according to the drag signal 110.

Further, the navigation device 1 comprises a navigation mode and a non-navigation mode. If the navigation device 1 enables the navigation mode, the processing module 12 can determine whether or not the drag signal 110 is to drag the point of interest from the primary display screen 131 to the secondary display screen 132; if yes, then the processing module 12 will analyze the path planning information according to the map information and the point of interest, and the at least one secondary display screen 132 will display the regional map corresponding to the point of interest or the local path planning corresponding to the path planning information. If the navigation device 1 enables the non-navigation mode, the processing module 12 will control the secondary display screen 132 to expand the map information to improve the field of view of map information.

It is noteworthy that even if the navigation device 1 enables the non-navigation mode, the processing module 12 still can determine whether or not the drag signal 110 is to drag the map information or the point of interest from the primary display screen 131 to the secondary display screen 132; if yes, then the processing module 12 will control the at least one secondary display screen 132 to display the regional map or the point-of-interest information corresponding to the point of interest. In addition, the processing module 12 can link to the point of interest to obtain the point-of-interest information corresponding to the point of interest.

Figure 2:
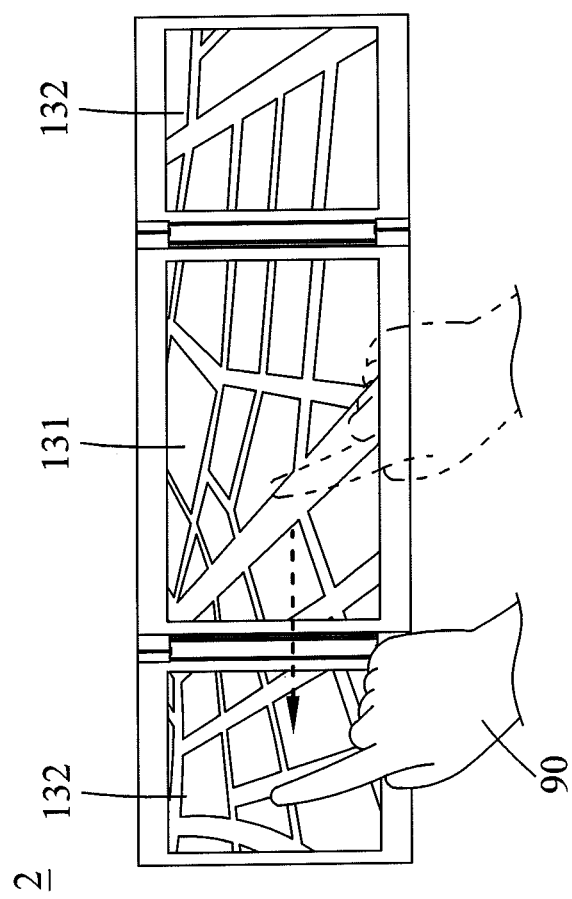
FIG. 2 is a first schematic view of a navigation device in accordance with the first preferred embodiment of the present invention.
Figure 3:
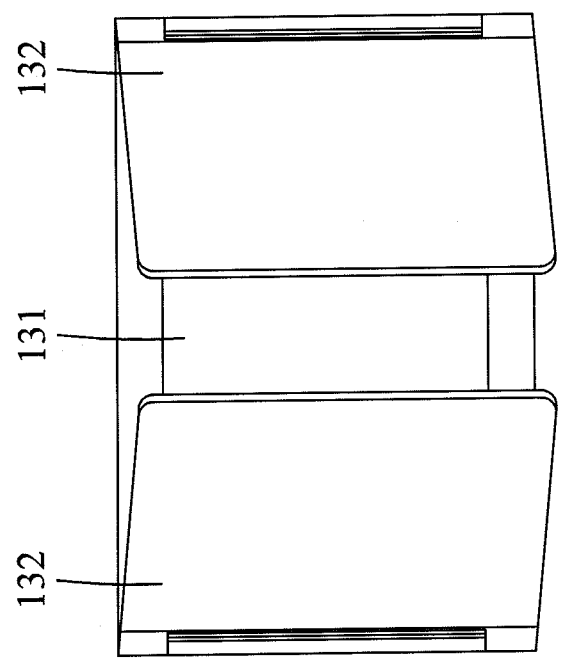
FIG. 3 is a second schematic view of a navigation device in accordance with the first preferred embodiment of the present invention.

With reference to FIGS. 2 and 3 for the first and second schematic views of a navigation device in accordance with the first preferred embodiment of the present invention respectively, the primary display screen 131 is preferably a screen and the secondary display screen 132 includes at least one screen. The following preferred embodiment adopts two secondary display screens 132 for illustrating the invention, but the quantity of the secondary display screens is not limited to two only, and those ordinarily skilled in the art may change this quantity easily to achieve the effects of the invention. In FIG. 2, the secondary display screen 132 is pivotally coupled to an adjacent left or right side of the primary display screen 131 and superimposed onto the primary display screen 131. It is noteworthy that the secondary display screen 132 and the primary display screen 131 have an included angle from 0 degree to 360 degrees. If the included angle between the secondary display screen 132 and the primary display screen 131 falls within a range from 180 degrees to 360 degrees, then the secondary display screen 132 can be used to block an external light source to prevent a light reflection.

In this preferred embodiment as shown in FIG. 3, the navigation device 2 opens a screen and enables a non-navigation mode, such that if a user clicks any point in the map information and drag the point from the primary display screen 131 to the secondary display screen 132, the processing module will control the at least one secondary display screen 132 to expand the map information to improve the field of view of the map information. In the left and right secondary display screens 132 as shown in the figure, a user drags the map information in the screen by a finger 90 to extend the map displayed on the primary display screen 131, so that the user can view more map information through the secondary display screens 132 on both sides of the primary display screen 131.

It is noteworthy that the installing positions of the secondary display screens 132 are not limited to both sides of the primary display screen 131 only, but the position and quantity of the secondary display screens 132 can be changed according to the actual requirements. Further, the map information can include the points of interest, such that when the user drags a point of interest in the primary display screen 131 to the secondary display screen 13, the processing module can control the at least one secondary display screen 132 to display a regional map or point-of-interest information corresponding to the point of interest. Further, the processing module can link to the point of interest to obtain point-of-interest information such as the scenic spot information or the scenic spot comments critics of the point of interest.

Based on the first preferred embodiment, the present invention further provides a second preferred embodiment to illustrate the present invention.

Figure 4:
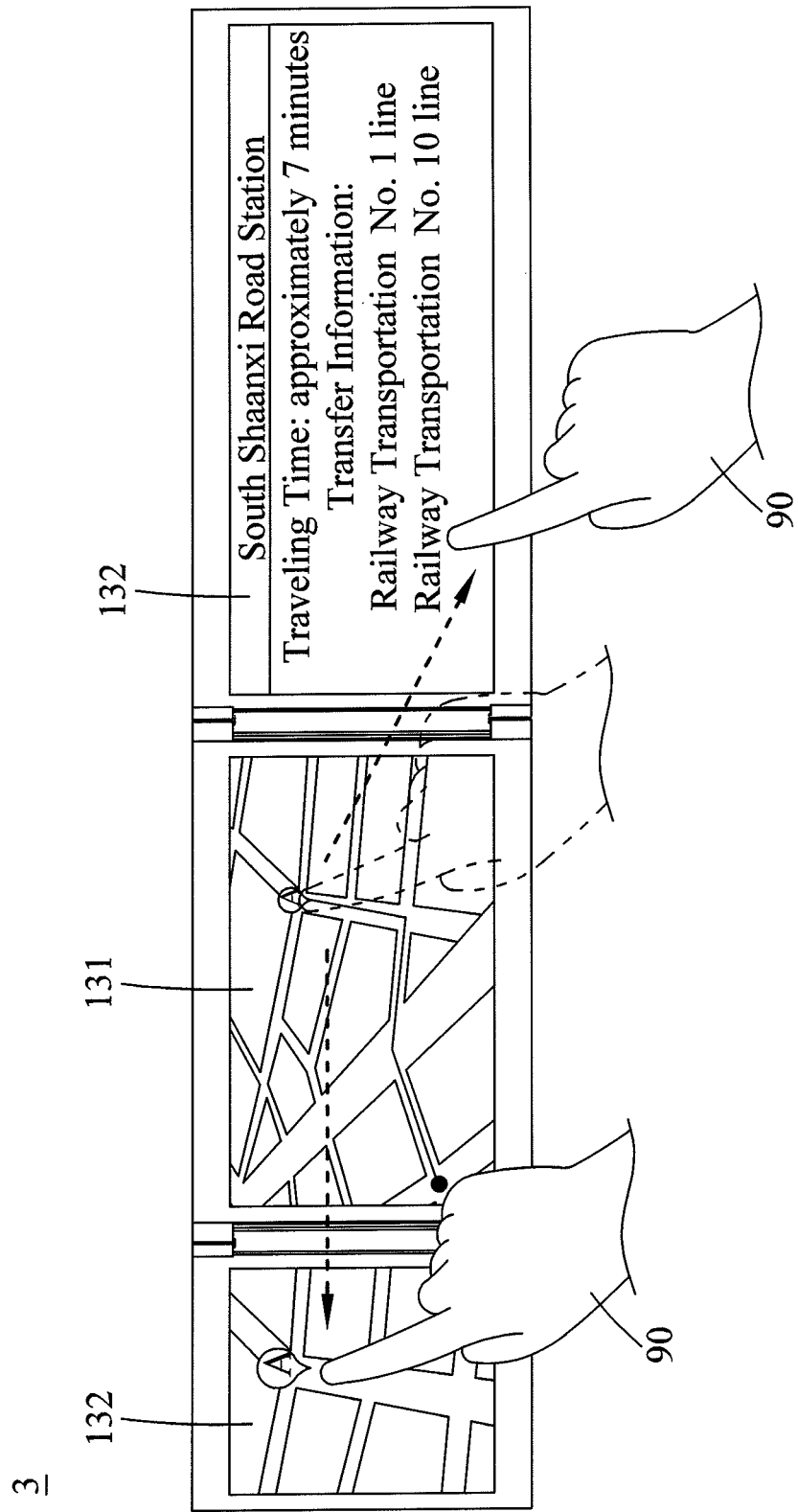
FIG. 4 is a schematic view of a navigation device in accordance with a second preferred embodiment of the present invention.

With reference to FIG. 4 for a schematic view of a navigation device in accordance with the second preferred embodiment of the present invention, the navigation device 3 opens a screen in a navigation mode, and the primary display screen 131 displays the map information and the point of interest. If the user clicks on the point of interest A and drags it to the left and right secondary display screens 132, the processing module will receive a drag signal and analyze the map information, the point of interest or both according to the drag signal to obtain a regional map, point-of-interest information or a local path planning. Therefore, the user can view the regional map (such as an enlarged intersection map) corresponding to the point of interest A displayed on the left secondary display screen 132. If the user drags the point of interest A to the right secondary display screen 132, then the information of the point of interest A will be displayed. For example, if the point of interest A is the South Shaanxi Road Station, and the right secondary display screen 132 displays the time for traveling from the current position to the point of interest A, or transfer information of taking a Train Line No. 1 or a Train Line No. 10 from the South Shaanxi Road Station. Therefore, if the user inputs the drag signal by a touch of a finger 90, the at least one secondary display screen 132 will provide more information.

It is noteworthy that if the user enables the navigation mode of the navigation device 3, the user can use the processing module to determine whether or not the drag signal is to drag the point of interest A from the primary display screen 131 to the at least one secondary display screen 132; if yes, then the processing module will analyze the path planning information according to the map information and the point of interest A and the processing module will control the at least one secondary display screen 132 to display the local path planning corresponding to the path planning information according to the point of interest or the path planning information, or the primary display screen 131 will display the local path planning corresponding to the path planning information.

Even though the concept of control method of the present invention has be described in the section of the navigation device of the present invention, the following flow chart is provided for illustrating the invention more clearly.

Figure 5:
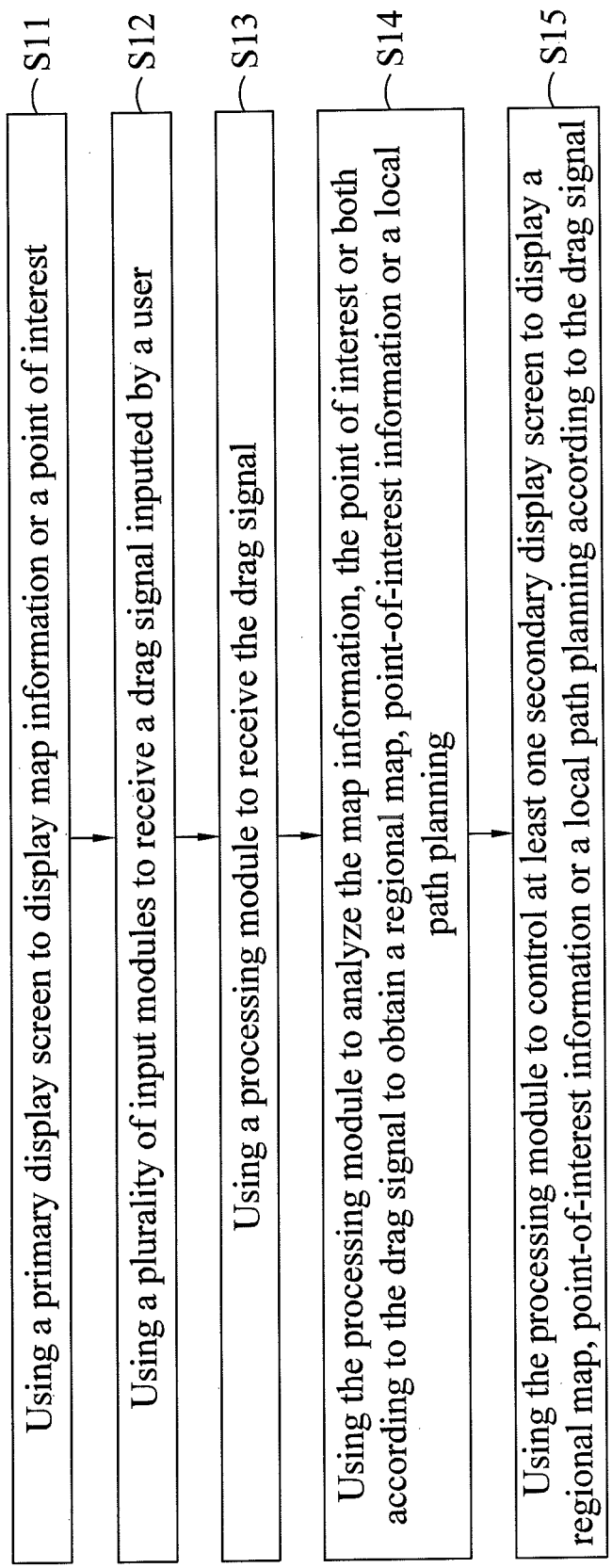
FIG. 5 is a flow chart of a control method in accordance with of the present invention.

With reference to FIG. 5 for a flow chart of a control method of the present invention, the control method is applied in a navigation device, wherein the details of the navigation device have been described above, and thus will not be repeated. In FIG. 5, the control method of the navigation device comprises the following steps:

S11: Using a primary display screen to display map information or a point of interest.

S12: Using a plurality of input modules to receive a drag signal inputted by a user.

S13: Using a processing module to receive the drag signal.

S14: Using the processing module to analyze the map information, the point of interest or both according to the drag signal to obtain a regional map, point-of-interest information or a local path planning.

S15: Using the processing module to control at least one secondary display screen to display a regional map, point-of-interest information or a local path planning according to the drag signal.

The details and implementation of the control method of the navigation device of the present invention have been described in the section of the navigation device of the present invention already, and thus will not be repeated.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A navigation device, comprising:
 a plurality of input modules, receiving a drag signal inputted by a user;
 a plurality of display modules, comprising a primary display screen and at least one secondary display screen, and the primary display screen displaying map information or a point of interest, and the at least one secondary display screen being pivotally coupled to an adjacent side of the primary display screen and superimposed onto the primary display screen; and
 a processing module, receiving and determining whether the drag signal is to drag the map information, the point of interest or both from the primary display screen to the at least one secondary display screen so as to obtain a regional map, point-of-interest information or a local path planning according to the map information, the point of interest or both, and controlling the at least one secondary display screen to display the regional map, the point-of-interest information or the local path planning according to the drag signal.

2. The navigation device of claim 1, further comprising a navigation mode, such that when the navigation device enables the navigation mode, the processing module determines whether the drag signal is to drag the point of interest from the primary display screen to the at least one secondary display screen, and then the processing module analyzes a path planning information according to the map information and the point of interest, and the at least one secondary display screen displays the regional map corresponding to the point of interest, if the drag signal is to drag the point of interest from the primary display screen to the at least one secondary display screen.

3. The navigation device of claim 2, wherein the processing module displays the local path planning corresponding to the path planning information on the at least one secondary display screen according to the point of interest or the path planning information.

4. The navigation device of claim 1, further comprising a non-navigation mode, such that when the navigation device enables the non-navigation mode, the processing module determines whether the drag signal is to drag the map information or the point of interest from the primary display screen to the at least one secondary display screen, and the processing module controls the at least one secondary display screen to display the regional map or the point-of-interest information corresponding to the point of interest, if the drag signal is to drag the map information or the point of interest from the primary display screen to the at least one secondary display screen.

5. The navigation device of claim 1, further comprising a non-navigation mode, such that when the navigation device enables the non-navigation mode, the processing module controls the at least one secondary display screen to expand the map information to improve the field of view of the map information.

6. The navigation device of claim 1, wherein the processing module determines whether the drag signal is to drag the point of interest from the primary display screen to the at least one secondary display screen, and the processing module links to the point of interest to obtain the point-of-interest information corresponding to the point of interest if the drag signal is to drag the point of interest from the primary display screen to the at least one secondary display screen.

7. The navigation device of claim 1, wherein the at least one secondary display screen has an included angle from 0 degree to 360 degrees with the primary display screen.

8. The navigation device of claim 7, wherein when the at least one secondary display screen has the included angle from 180 degrees to 360 degrees with the primary display screen, the at least one secondary display screen blocks an external light source to prevent a light reflection.

9. A control method, applied in a navigation device, and the navigation device comprising a plurality of input modules, a plurality of display modules and a processing module, and the plurality of display modules comprising a primary display screen and at least one secondary display screen, and the control method comprising the steps of:
  using the primary display screen to display map information or a point of interest;
  using the plurality of input modules to receive a drag signal inputted by a user;
  using the processing module to receive the drag signal;
  using the processing module to determine whether the drag signal is to drag the map information, the point of interest or both from the primary display screen to the at least one secondary display screen so as to obtain a regional map, point-of-interest information or a local path planning according to the map information, the point of interest or both; and
  using the processing module to control the at least one secondary display screen to display the regional map, the point-of-interest information or the local path planning according to the drag signal.

10. The control method of claim 9, further comprising the steps of:
  enabling a navigation mode of the navigation device;
using the processing module to determine whether the drag signal is to drag the point of interest from the primary display screen to the at least one secondary display screen;
  using the processing module to analyze path planning information according to the map information and the point of interest, if the drag signal is to drag the point of interest from the primary display screen to the at least one secondary display screen; and
  using the processing module to control the at least one secondary display screen to display the regional map corresponding to the point of interest.

11. The control method of claim 10, further comprising the step of using the processing module to control the at least one secondary display screen to display the local path planning corresponding to the path planning information according to the point of interest or the path planning information.

12. The control method of claim 9, further comprising the steps of:
  enabling a non-navigation mode of the navigation device;
  using the processing module to determine whether the drag signal is to drag the map information or the point of interest from the primary display screen to the at least one secondary display screen; and
  using the processing module to control the at least one secondary display screen to display the regional map or the point-of-interest information corresponding to the point of interest, if the drag signal is to drag the map information or the point of interest from the primary display screen to the at least one secondary display screen.

13. The control method of claim 9, further comprising the steps of:
  enabling a non-navigation mode of the navigation device; and
  using the processing module to control the at least one secondary display screen to expand the map information to improve the field of view of the map information.

14. The control method of claim 9, further comprising the steps of:
  using the processing module to determine whether the drag signal is to drag the point of interest from the primary display screen to the at least one secondary display screen;
  using the processing module to link to the point of interest to obtain the point-of-interest information corresponding to the point of interest, if the drag signal is to drag the point of interest from the primary display screen to the at least one secondary display screen; and
  using the at least one secondary display screen to display the point-of-interest information.

15. The control method of claim 9, wherein the at least one secondary display screen has an included angle from 0 degree to 360 degrees with the primary display screen.

16. The control method of claim 15, further comprising the steps of:
  opening the at least one secondary display screen and the primary display screen, such that the at least one secondary display screen and the primary display screen have the included angle from 180 degrees to 360 degrees; and
  using the at least one secondary display screen to block an external light source to prevent a light reflection.

* * * * *